United States Patent
Handle et al.

(10) Patent No.: US 11,773,882 B2
(45) Date of Patent: Oct. 3, 2023

(54) MOTOR COOLING VIA HYDRAULIC FLUID

(71) Applicant: Moog GmbH, Boblingen (DE)

(72) Inventors: Werner Handle, Marbach a. N. (DE); Achim Helbig, Stuttgart (DE)

(73) Assignee: Moog GmbH, Böblingen (DE)

( * ) Notice: Subject to any disclaimer, the term of this patent is extended or adjusted under 35 U.S.C. 154(b) by 41 days.

(21) Appl. No.: 17/608,710

(22) PCT Filed: May 5, 2020

(86) PCT No.: PCT/EP2020/062431
§ 371 (c)(1),
(2) Date: Nov. 3, 2021

(87) PCT Pub. No.: WO2020/225253
PCT Pub. Date: Nov. 12, 2020

(65) Prior Publication Data
US 2022/0213905 A1     Jul. 7, 2022

(30) Foreign Application Priority Data
May 8, 2019   (DE) .......................... 102019112022.5

(51) Int. Cl.
*F15B 21/04*   (2019.01)
*F15B 11/08*   (2006.01)
(Continued)

(52) U.S. Cl.
CPC .............. *F15B 21/04* (2013.01); *F15B 11/08* (2013.01); *H02K 5/203* (2021.01); *F15B 7/006* (2013.01);
(Continued)

(58) Field of Classification Search
CPC ............ F15B 7/006; F15B 2211/20515; F15B 2211/27; F15B 2211/611
See application file for complete search history.

(56) References Cited

U.S. PATENT DOCUMENTS 6,966,240 B2 *  11/2005  Kipfelsberger ....... B25B 21/005
                                                          81/57.44
8,341,956 B2 *   1/2013  Makino ................. F04B 49/002
                                                          60/443
(Continued)

FOREIGN PATENT DOCUMENTS

DE           10117373 A1    10/2002
DE   10 2007 053263 A1     5/2009
(Continued)

OTHER PUBLICATIONS

European Patent Office (ISA/EP), International Search Report and Written Opinion in PCT/EP2020/062431, dated Aug. 4, 2020, 11 pages.

*Primary Examiner* — Thomas E Lazo
(74) *Attorney, Agent, or Firm* — Harter Secrest & Emery LLP

(57) ABSTRACT

The hydraulic system according to the invention comprises a hydraulic circuit with a low-pressure region and a high-pressure region; a volume- and/or speed-variable hydraulic machine, which is driven by a first electric motor and has an inlet and an outlet and provides a volume flow of a hydraulic fluid in the high-pressure region of the hydraulic circuit. The hydraulic system according to the invention further comprises at least one movable shaft, which is arranged in the high-pressure region of the hydraulic circuit; at least one valve, which separates the high-pressure region from the low-pressure region; and at least one hydraulic fluid container, which is hydraulically connected to the low-pressure region of the hydraulic circuit. The hydraulic system according to the invention also has a discharge line, which discharges hydraulic fluid from the leakage of the hydraulic machine, and a cooling line for transporting the hydraulic fluid in order to cool the electric motor, the discharge line (Continued)

Figure 1:
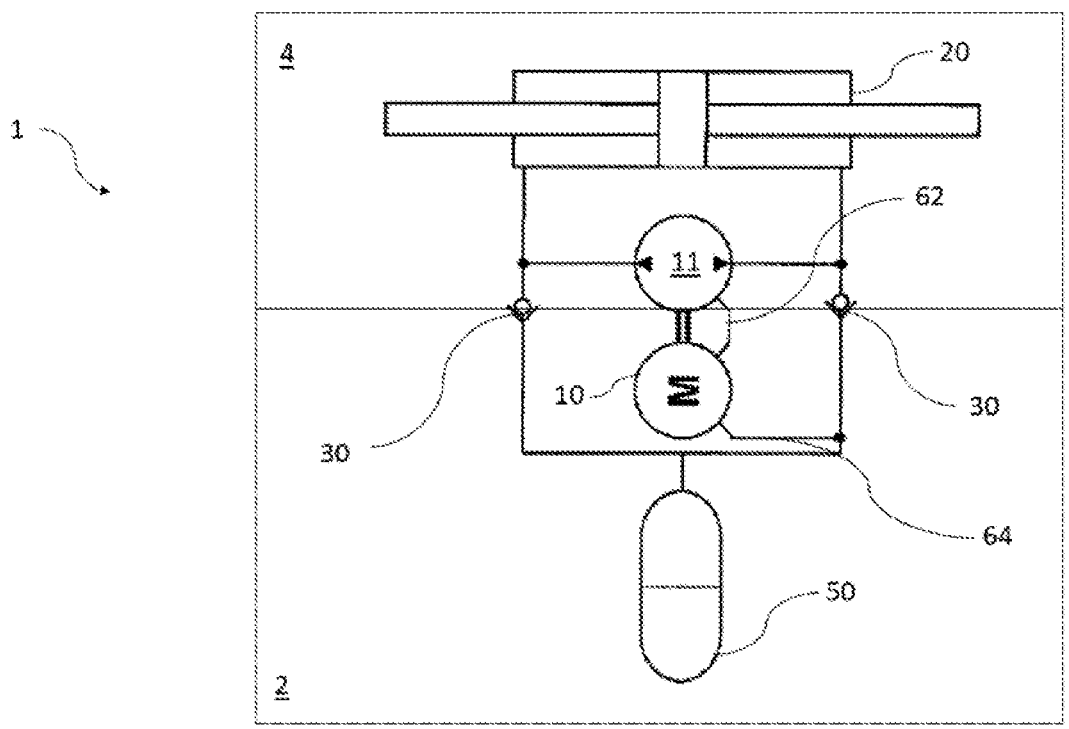

and the cooling line being fluidically connected to at least one of the hydraulic fluid containers.

18 Claims, 3 Drawing Sheets

(51) Int. Cl.
*H02K 5/20* (2006.01)
*F15B 7/00* (2006.01)

(52) U.S. Cl.
CPC . *F15B 2211/20515* (2013.01); *F15B 2211/27* (2013.01); *F15B 2211/41572* (2013.01); *F15B 2211/611* (2013.01); *F15B 2211/62* (2013.01)

(56) References Cited

U.S. PATENT DOCUMENTS

| 8,342,086 B2* | 1/2013 | Resch | B30B 15/163 |
|---|---|---|---|
| | | | 100/269.13 |
| 2013/0336802 A1* | 12/2013 | Galloway | F04B 1/0421 |
| | | | 417/2 |

FOREIGN PATENT DOCUMENTS

| WO | 2009102740 A2 | 8/2009 |
|---|---|---|
| WO | 2012091942 A1 | 7/2012 |

\* cited by examiner

MOTOR COOLING VIA HYDRAULIC FLUID

The present invention relates to a hydraulic system for driving an actuator, and in particular to a hydraulic system for driving an actuator with an alternative type of motor cooling.

In order to provide a volume flow in a hydraulic system, in the prior art, a hydraulic machine driven by an electric motor is usually used. Continuous operation of the electric motor leads to it becoming warm or heating up, and, accordingly, the electric motor must be cooled in order to prevent damage—which may be connected to an overloading of a motor.

In the prior art, there are a variety of different possibilities for providing cooling for an electric motor. The hydraulic system usually has a cooling circuit which is arranged around the housing of the electric motor. The cooling circuit is in this case an independent circuit, which, according to the prior art, can be controlled independently of the other circuits in the hydraulic system with regard to pressure, volume, etc.

Furthermore, in the prior art, water is often used for cooling the electric motor. However, since conventional electric motors have a housing made of aluminum, corrosion often occurred in the housing. Consequently, the electric motor housings had to be manufactured from stainless steel, which, however, leads to higher costs and also to a greater weight of the electric motor.

Alternatively, in the cooling circuits of the prior art, a coolant is used, which is, however, also expensive. Furthermore, the strict separation of the cooling circuit from the further circuits of the hydraulic system must be ensured, since mixing the coolant with the hydraulic fluid must at all costs be prevented during operation of the hydraulic system.

A separate and independent cooling circuit requires its own control system and, accordingly, an increased number of devices. In particular, a volume flow of the coolant must be provided in the cooling circuit, as a result of which further pump units with at least one motor typically need to be arranged in or at the cooling circuit.

It is therefore an aim of the present application to provide an alternative motor cooling in which the disadvantages of the prior art are at least partially avoided.

These and further aims are at least partially achieved by a hydraulic system according to independent claim 1. Preferred embodiments and developments of the hydraulic system according to the invention are the subject matter of the dependent claims.

The hydraulic system according to the invention comprises a hydraulic circuit having a low-pressure region and a high-pressure region; a volume- and/or speed-variable hydraulic machine, which is driven by a first electric motor and has an inlet and an outlet and provides a volume flow of a hydraulic fluid in the high-pressure region of the hydraulic circuit.

Furthermore, the hydraulic system according to the invention comprises at least one movable shaft, which is arranged in the high-pressure region of the hydraulic circuit; at least one valve, which separates the high-pressure region from the low-pressure region, and at least one hydraulic fluid container, which is hydraulically connected to the low-pressure region of the hydraulic circuit.

The hydraulic system according to the invention further has a discharge line which discharges hydraulic fluid from leakage of the hydraulic machine, and a cooling line for transporting the hydraulic fluid for cooling the electric motor, wherein the discharge line and the cooling line are fluidically connected to at least one of the hydraulic fluid containers.

According to the invention, for operating a shaft, a hydraulic system is accordingly provided which has both a low-pressure region and a high-pressure region, wherein the at least one shaft is arranged in the high-pressure region. In order to provide a volume flow in the high-pressure region, and thus for the operation of the shaft, a hydraulic machine driven by an electric motor is used.

Electric motors, such as are used in the hydraulic system according to the invention, are known in the prior art and serve to drive the hydraulic machine.

The hydraulic machine is volume- and/or speed-variable and, during operation, can preferably provide two flow directions of the hydraulic fluid in the hydraulic circuit. The hydraulic machine may further have either an electric motor with variable speed and a fixed displacement pump, or an electric motor with constant speed and a variable displacement pump, or an electric motor with variable speed and a variable displacement pump. The selection of the hydraulic machine is in this case determined by factors such as system costs, efficiency, reliability, permitted noise emission, or efficiency.

The low-pressure region has a pre-pressurized hydraulic fluid with a pressure which lies between the ambient pressure (normal pressure 1.013 bar) and 50 bar. It is advantageous in this case for the hydraulic fluid in the low-pressure region to have a pressure of between 0.5 bar and 40 bar—in particular, between 1 bar and 30 bar, and, particularly preferably, between 10 bar and 25 bar.

According to an embodiment according to the invention, the hydraulic fluid can, in the low-pressure region, accordingly have an increased pressure (>20 bar), but below 50 bar, or a lower pressure (<20 bar). In contrast, the hydraulic fluid in the high-pressure region can have a pressure of up to 200 bar and is always above the level of the low-pressure region.

The shaft of the hydraulic system according to the invention is movable longitudinally and has at least one chamber. The movement of the shaft, i.e., preferably of a hydraulic piston, is provided by means of the hydraulic fluid entering or exiting at least one chamber(s) of the shaft and the associated pressure build-up or pressure reduction. The shaft is arranged in the high-pressure region of the hydraulic circuit and hydraulically connected thereto.

According to the invention, the shaft can be a hydraulic cylinder, a differential cylinder, a telescopic cylinder, a multi-gear cylinder, a combination of these, or the like. Furthermore, two, three, or more shafts may also be part of the hydraulic system.

The separation of the high-pressure region from the low-pressure region is provided by means of at least one valve. Furthermore, in the low-pressure region, at least one hydraulic fluid container is arranged which is hydraulically connected to the low-pressure region of the hydraulic circuit.

According to an embodiment according to the invention, the at least one valve is a check valve—in particular, a controlled check valve. The valve can be controlled either electrically or hydraulically.

The at least one hydraulic fluid container can provide the pre-pressurization of the system, and, in particular, the pre-pressurization of the low-pressure region. The hydraulic fluid container can, for example, be a pressure accumulator which has a hydraulic fluid to which a pressure is applied. The pressure of the hydraulic fluid in the pressure accumulator is essentially the pressure which the hydraulic fluid has in the lines of the low-pressure region.

Furthermore, the hydraulic fluid container can also be a pressure accumulator of variable volume, whereby a pressure build-up, and thus a pre-pressurization of the low-pressure region of the hydraulic system, can be regulated and controlled.

Furthermore, the hydraulic system according to the invention has a discharge line, which discharges hydraulic fluid from leakage of the hydraulic machine, and a cooling line, through which flows hydraulic fluid, which serves to cool the hydraulic machine. According to the invention, both the discharge line and the cooling line are fluidically connected to at least one of the hydraulic fluid containers.

The leakage from a hydraulic pump is a volume flow which, despite the existing seals, emerges from the pressure areas of the pump without performing any useful work. The size of the leakage flow depends, in addition to geometric variables of the leakage point, upon the pressure difference between the pressure chamber and its surroundings, as well as upon the viscosity of the escaping medium and its temperature.

These leakage flows are usually ignored, with the leakage being lost, or being collected and used elsewhere. Where appropriate, the leakage can also be fed back into the hydraulic system by means of an additional pump unit.

The hydraulic system according to the invention has a discharge line which is arranged on the hydraulic machine and which forwards the leakage or leakage flow resulting from the operation of the hydraulic machine.

Furthermore, a cooling line is arranged in the hydraulic system according to the invention. This serves in particular for cooling the electric motor and preferably runs in and/or on the housing of the electric motor and cools it.

According to the invention, the discharge line and the cooling line are fluidically connected to at least one of the hydraulic fluid containers. This means, in particular, that the discharge line and the cooling line are fluidically connected to the low-pressure region.

In the present invention, the term, "fluidically connected," is understood to mean a connection through which fluid—in particular, a hydraulic fluid—can flow. In particular, "fluidically connected" means that the connection is not necessarily direct, but that further devices can also be interposed. For example, if it is disclosed that "device A is fluidically connected to device B," this means that fluid can flow from A to B, wherein further devices, such as further valves, through which the hydraulic fluid can flow, can also be arranged between the device A and the device B.

According to one embodiment according to the invention, the discharge line and the cooling line are fluidically connected in series or in parallel to at least one of the hydraulic fluid containers.

Both alternatives are advantageous for the hydraulic system according to the invention. If the discharge line and the cooling line are connected in series to the hydraulic fluid container, the hydraulic fluid from the leakage will preferably be used as coolant for the motor.

In particular, the hydraulic fluid flows from the leakage via the discharge line into the cooling line of the electric motor, and thus in and/or on the housing of the electric motor, whereby the latter is cooled.

According to a preferred embodiment, the flow of the hydraulic fluid out of the leakage occurs due to the leakage pressure of the hydraulic fluid. In particular, the pressure of the leakage changes in proportion to the pressure at which the hydraulic machine works. However, the pressure of the leakage is always higher than the pressure of the low-pressure region.

This embodiment is cost-saving, since the hydraulic fluid from the leakage is not only returned to the hydraulic system, but is also used as a coolant. Thus, no separate coolant is required for cooling the electric motor, as a result of which material costs and coolant costs are saved. Furthermore, this reduces maintenance work and outlay on the entire hydraulic system.

If the discharge line and the cooling line are arranged in parallel, the leakage fluid will be re-used, which also leads to cost savings. Since the cooling line is fluidically connected to the low-pressure region, likewise in this embodiment according to the invention, hydraulic fluid is used instead of coolant to cool the electric motor.

According to a further embodiment according to the invention, an inlet is hydraulically connected to the hydraulic circuit in the low-pressure region. In a further embodiment according to the invention, the discharge line and/or the cooling line are hydraulically connected to the hydraulic circuit in the low-pressure region.

Furthermore, the inlet can be hydraulically connected to the discharge line and/or to the cooling line.

According to a further embodiment according to the invention, a second hydraulic machine that is volume- and/or speed-variable and driven by an electric motor is arranged in the inlet of the discharge line and/or of the cooling line.

The connection of the inlet to the discharge line and/or cooling line improves the flow of the leakage and/or the hydraulic fluid in the cooling line. In particular, control of the flow in the discharge line and/or cooling line is improved by using a further hydraulic machine, so that, according to a further embodiment according to the invention, the second hydraulic machine controls the hydraulic fluid flow as a function of the temperature of and/or the load on the electric motor.

For example, sensors that measure the temperature of the electric motor and forward it to a control unit could be connected to the electric motor housing. Consequently, the control unit can regulate or control the flow of the hydraulic fluid in the leakage and/or cooling line via the second electric motor as a function of the measured temperature. Furthermore, it is possible for the control unit to control or regulate the flow of the hydraulic fluid as a function of a measured load on the electric motor.

Furthermore, in accordance with another embodiment of the hydraulic system according to the invention, a restrictor is arranged at the inlet of the discharge line and/or of the cooling line.

If the discharge line and the cooling line are arranged in parallel to one another, and a restrictor is arranged both at the inlet of the discharge line and at the inlet of the cooling line, it will then be possible to control the volume flow and the velocity of the flow in the discharge line and cooling line by means of the restrictors. In particular, it is thus possible to control which of the two lines (discharge line and/or cooling line) requires a higher volume flow. If the electric motor becomes too warm, the flow through the discharge line can be reduced with the restrictor, for example, and the flow through the cooling line thus be increased.

In a further embodiment according to the invention, a hydraulic fluid container is arranged in the low-pressure region. In this embodiment, it is assumed that only one hydraulic fluid container is arranged in the hydraulic system. Furthermore, the one hydraulic fluid container according to a further embodiment according to the invention can be a closed container—in particular, a pressure accumulator. Here, the pressure of the hydraulic fluid in the pressure accumulator is comparable to the pressure of the hydraulic fluid in the low-pressure region of the hydraulic circuit. In particular, the pressure accumulator serves to pre-pressurize the hydraulic fluid in the low-pressure region.

According to a further embodiment according to the invention, the hydraulic system has a further hydraulic fluid container, which is also arranged in the low-pressure region. Thus, according to a further embodiment, the first hydraulic fluid container can be a closed container—in particular, a pressure accumulator, as mentioned above—and the further hydraulic fluid container can be a non-pressurized—in particular, open—container.

In the following, the term, "non-pressurized," refers to an ambient pressure, which is usually about 1 bar (1.013 bar).

Since the pressure of the hydraulic fluid in the open container is lower than the pressure of the hydraulic fluid in the low-pressure region, a further hydraulic machine can be arranged according to a further embodiment according to the invention between the low-pressure region of the hydraulic circuit and the further hydraulic fluid container. This serves to feed hydraulic fluid into the low-pressure region from the further hydraulic fluid container or from the open tank.

By using an open container as the second hydraulic fluid container, cooling of the hydraulic fluid in the tank is provided.

According to a further embodiment according to the invention, the discharge line and the cooling line are thus fluidically connected to the second hydraulic fluid container. Accordingly, the discharge line and the cooling line are fluidically connected, via the inlet, to the low-pressure region of the hydraulic circuit and the first closed container, i.e., to the first hydraulic fluid container, and are simultaneously fluidically connected to the further, second, open hydraulic fluid container.

Consequently, in this embodiment according to the invention, the hydraulic fluid from the leakage and out of the cooling line is passed into the further hydraulic fluid container—in particular, into the open tank. From the further hydraulic fluid container, the cooled hydraulic fluid is fed back into the lines of the low-pressure region by means of the further hydraulic machine.

Furthermore, according to a further embodiment according to the invention, the inlet of the discharge line and/or the inlet of the cooling line are also fluidically connected to the further hydraulic fluid container.

This is followed by the hydraulic fluid, which is used for cooling and flows into the further hydraulic fluid container. This is advantageous, since the possibly highly-heated hydraulic fluid, which was used for cooling, can thus "cool down" in the second hydraulic fluid container, wherein cooling is improved when the further hydraulic fluid container is an open tank.

According to a further embodiment according to the invention, a cooler is arranged in the low-pressure region and/or in/at the inlet or in/at the discharge line or in/at the cooling line, or in/at one of the hydraulic fluid containers.

The heated hydraulic fluid can be cooled more quickly by the cooler, and thus be re-used in the hydraulic system. In addition, the use of a closed hydraulic fluid container, instead of an open tank, for the further hydraulic fluid container is thus possible. This saves space, since open tanks are usually bigger than pressure accumulators. Furthermore, the amount of hydraulic fluid required is thus reduced.

However, if the further hydraulic fluid container is an open tank, the use of a cooler has the advantage that the tank can be smaller.

Furthermore, filter devices and/or air vents can also be arranged in the low-pressure region of the hydraulic system.

According to all of the aforementioned embodiments, a method for using the hydraulic circuit is claimed according to the invention in which a hydraulic fluid—in particular, at least partially from leakage of the hydraulic machine—is used for cooling the hydraulic machine and/or the electric motor.

The invention is explained below on the basis of various exemplary embodiments, wherein it is pointed out that these examples encompass modifications or additions that are immediately apparent to the person skilled in the art.

Figure 2:
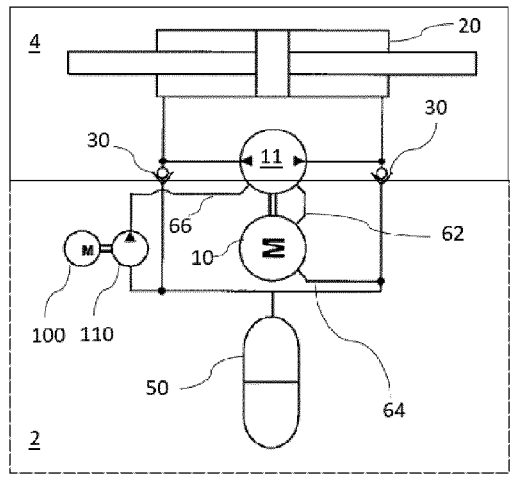
Figure 3:
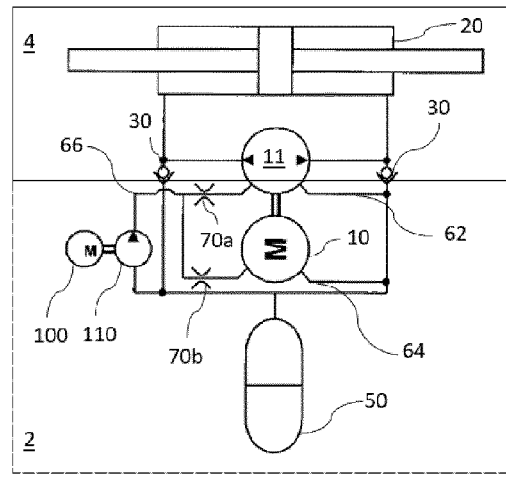
Figure 4:
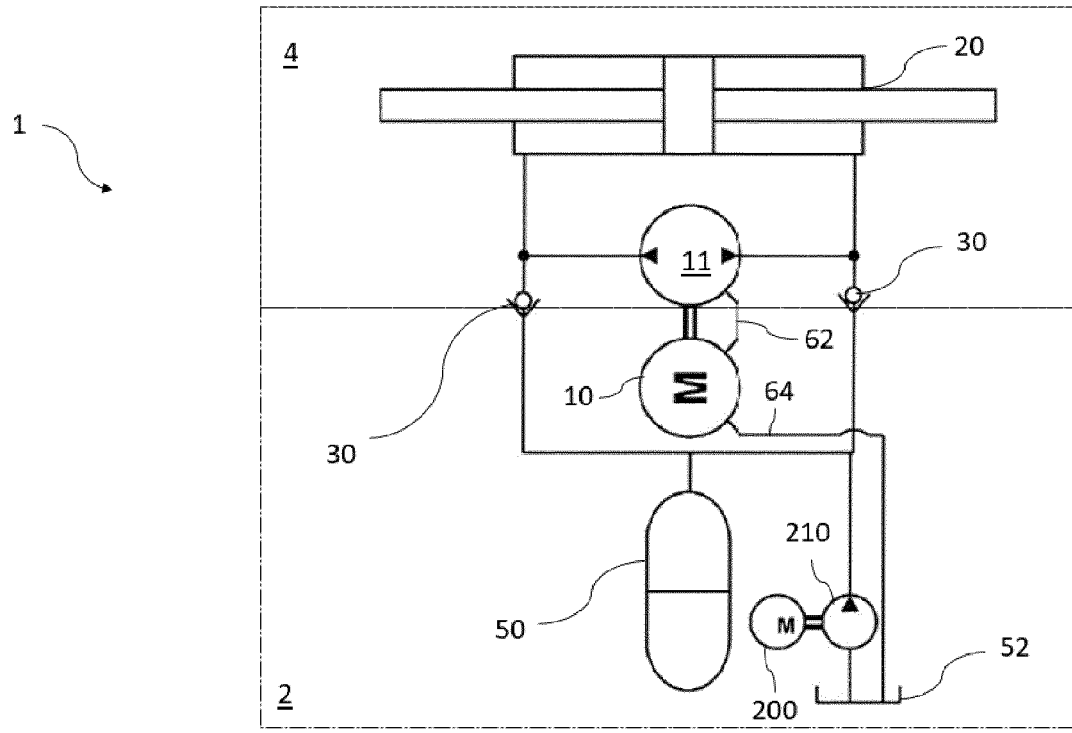
Figure 5:
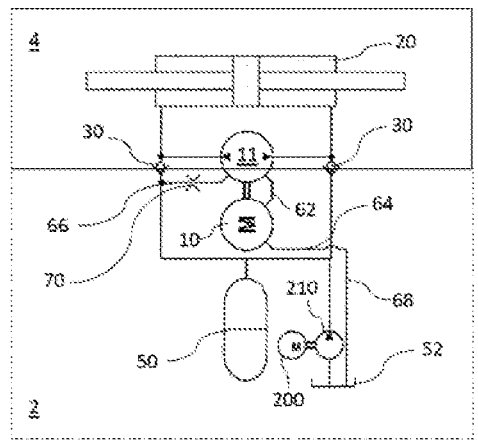
Figure 6:
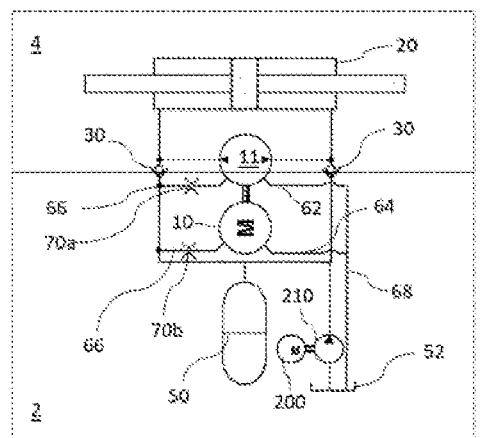
Figure 7:
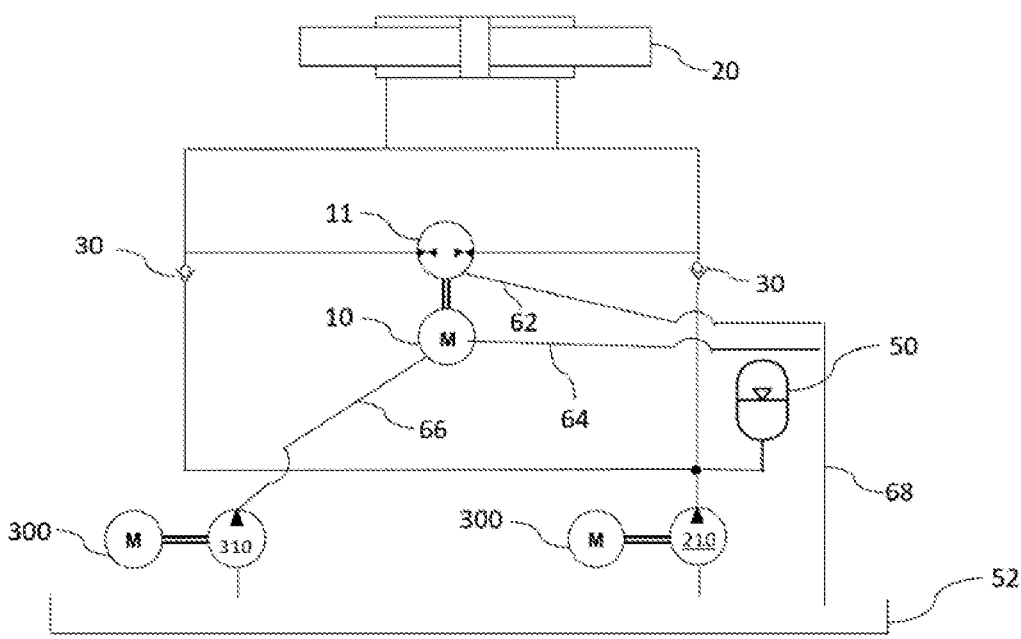

The following are shown:

FIG. 1: a schematic representation of a system according to the invention;

FIG. 2: a schematic further exemplary embodiment of the system according to the invention;

FIG. 3: another exemplary embodiment of the hydraulic system, with a discharge line and cooling line arranged in parallel;

FIG. 4: an embodiment of the hydraulic system from FIG. 1, comprising a further hydraulic fluid container;

FIG. 5: a schematic further exemplary embodiment of the system according to the invention from FIG. 4;

FIG. 6: a schematic further exemplary embodiment of the system according to the invention from FIG. 4;

FIG. 7: yet another embodiment of the hydraulic system according to the invention.

FIG. 1 shows an exemplary embodiment according to the invention of the hydraulic system 1. As can be seen from the figure, the hydraulic system can be divided into two regions: a low-pressure region 2, in which the hydraulic fluid has a low pressure—in particular, a pressure between ambient pressure and 30 bar—and a high-pressure region 4, in which the hydraulic fluid has a high pressure—in particular, above 30 bar—which is used to move a shaft 20 arranged in the hydraulic system and connected to the high-pressure region 4 of the hydraulic system 1.

The hydraulic system 1 has a first electric motor 10 and a hydraulic machine 11 driven by the electric motor 10. This is arranged in the high-pressure region 4 and serves to provide a volume flow of the hydraulic fluid in the shaft 20. The shaft is shown as a double-acting hydraulic cylinder with two chambers. The hydraulic machine has two outputs or inputs, each of which is connected to a chamber of the shaft 20. The hydraulic machine can thus convey hydraulic fluid from one chamber of the shaft 20 into the other chamber of the shaft 20, whereby a movement of the shaft 20 is provided.

The high-pressure region 4 and the low-pressure region 2 are separated from one another by means of unlockable check valves 30.

Due to the continuous operation of the hydraulic machine 11, leakages occur at the hydraulic machine 11, as a result of which the volume of hydraulic fluid in the high-pressure region 4 drops. By precisely adjusting the spring strength in the check valves 30 or by electrical unlocking, the missing volume of hydraulic fluid can be conducted from the low-pressure region 2 into the high-pressure region 4.

According to FIG. 1, a hydraulic fluid container 50, which is designed as a pressure accumulator 50, is hydraulically connected to the low-pressure region 2 of the hydraulic system 1.

As shown in FIG. 1, the hydraulic system 1 comprises a discharge line 62 which is connected to the leakage or to the leakage collection area of the hydraulic machine in such a way that the leakage fluid can be fed back into the low-pressure region through the discharge line.

In this respect, according to this exemplary embodiment according to the invention, the discharge line 62 has been connected to the cooling line 64 of the electric motor so that the leakage fluid is used as coolant for the electric motor 11. In this example, the discharge line and the cooling line are thus arranged in series. The cooling line 64 is in turn fluidically connected to the low-pressure region 2 and, in particular, fluidically connected to the hydraulic fluid container 50. The leakage fluid is thus used for cooling and subsequently fed back into the system.

FIG. 2 shows an alternative exemplary embodiment of the hydraulic system 1 according to the invention from FIG. 1.

While the general design of the embodiment according to FIG. 2 corresponds to the design of FIG. 1, the hydraulic system of FIG. 1 furthermore comprises an inlet 66 and a second electric motor 100 with a second hydraulic machine 110 driven by the electric motor.

The inlet 66 is connected to the leakage area via the housing of the hydraulic machine 11, which is hydraulically connected in series to the discharge line 62 as in FIG. 1.

The inlet 66 is furthermore fluidically connected to the low-pressure region 2 via the second hydraulic machine 110. An improved control of the volume flow through the discharge line and/or the cooling line can thus be achieved by means of the hydraulic machine 110.

FIG. 3 shows another exemplary alternative embodiment according to the invention of FIG. 2. In this exemplary embodiment, the discharge line 62 and the cooling line 64 are arranged in parallel so that both lines are hydraulically connected to the low-pressure region 2. By contrast, the inlet 66 is hydraulically connected, via a restrictor 70b, to the cooling line and thus to the housing of the electric motor 10, and, via a further restrictor 70a, to the discharge line. The inlet 66 is connected to the low-pressure region 2 via the hydraulic machine 110. The restrictors 70a and 70b thus serve to regulate the volume flow in the discharge line 62 and/or the cooling line 64.

FIG. 4 shows another exemplary embodiment according to the invention of the hydraulic system 1 from FIG. 1.

As can be seen from FIG. 4, the following exemplary embodiment according to the invention has a further hydraulic fluid container 52 which, in contrast to the first hydraulic fluid container 50, is an open tank. The open tank 52 is also fluidically connected to the low-pressure region 2.

According to this exemplary embodiment according to the invention, the cooling line 64 and the discharge line 62 are connected to one another in series. Furthermore, they are fluidically connected to the hydraulic fluid container 52 so that hydraulic fluid flows from the leakage area of the hydraulic machine 11, through the cooling line of the electric motor 10, and then into the hydraulic fluid container 52.

Furthermore, a further hydraulic machine 210 driven by an electric motor 200 is arranged between the hydraulic fluid container 50 and the low-pressure region 2. The hydraulic machine provides a fluid flow from the further hydraulic fluid container 52 into the low-pressure region 2.

The further structure of the exemplary embodiment according to the invention from FIG. 4, and, in particular, the structure of the high-pressure region, corresponds to the exemplary embodiment of the hydraulic system 1 from FIG. 1.

FIG. 5 shows yet another exemplary embodiment according to the invention of the hydraulic system 1.

As can be seen from the figure, a second hydraulic fluid container 52 is also fluidically connected here to the low-pressure region of the hydraulic system via an additional hydraulic machine 210. Furthermore, the discharge line 62 and the cooling line 64 are fluidically connected in series and to the hydraulic fluid container 52.

In contrast to FIG. 4, in this system of FIG. 5, an inlet 66 is connected to the discharge line 62 of the hydraulic machine 11. This inlet is furthermore hydraulically connected to the low-pressure region 2 of the hydraulic system 1. A restrictor 70 is arranged in the inlet and regulates or controls the flow of the hydraulic fluid into the discharge line 52.

FIG. 6 is similar to FIG. 5, wherein, in this exemplary embodiment according to the invention, the discharge line and the cooling line are fluidically connected in parallel to a line 68 which itself is hydraulically connected to the second hydraulic fluid container 52.

Furthermore, the inlet 66 is fluidically connected to the discharge line 62 via a restrictor 70a and to the cooling line 64 via a second restrictor 70b. Furthermore, the inlet is fluidically connected to the low-pressure region 2 of the hydraulic system 1.

FIG. 7 shows another exemplary embodiment according to the invention of the hydraulic system 1.

As already shown in the previous embodiments, a further hydraulic fluid container 52, with an open design, is arranged in the low-pressure region 2 of the hydraulic circuit 1 via a hydraulic machine 210.

The discharge line 62 and the cooling line 62 are arranged in series and are fluidically connected to the hydraulic fluid container 52 via a line 68. An inlet 66 is fluidically connected to the cooling line 64 at one end and to the hydraulic fluid container 52 at the other end via a further hydraulic machine 310, which is driven by a further, third electric motor 300. The hydraulic fluid required for cooling is thus still obtained from the low-pressure region 2.

1 Hydraulic system
2 Low-pressure region
4 High-pressure region
10 First electric motor
11 Hydraulic machine
20 Shaft
30 Check valve
50 First hydraulic fluid container
52 Second hydraulic fluid container
62 Discharge line
64 Cooling line
66, 66a, 66b Inlet
68 Line
70, 70a, 70b Restrictor
100 Second electric motor
110 Second hydraulic machine
200 Electric motor
210 Hydraulic machine

The invention claimed is:
1. A hydraulic system, comprising:
a hydraulic circuit, wherein the hydraulic circuit has a low-pressure region and a high-pressure region;
a volume-variable and/or speed-variable hydraulic machine, which is driven by a first electric motor and has a first inlet and an outlet for providing a volume flow of a hydraulic fluid in the high-pressure region of the hydraulic circuit;
at least one movable shaft, wherein the shaft is arranged in the high-pressure region of the hydraulic circuit;
at least one valve which separates the high-pressure region from the low-pressure region;

at least one hydraulic fluid container, which is hydraulically connected to the low-pressure region of the hydraulic circuit;
a discharge line, which discharges from the hydraulic machine hydraulic fluid from leakage of the hydraulic machine;
a cooling line for transporting the hydraulic fluid for cooling the electric motor;
the discharge line and the cooling line fluidically connected to the at least one hydraulic fluid container;
the hydraulic machine having a second inlet, which is hydraulically connected to the hydraulic circuit in the low-pressure region; and
the second inlet connected to the leakage and to the discharge line via a housing of the hydraulic machine.

2. The hydraulic system according to claim 1, wherein the discharge line and the cooling line are fluidically connected in series or in parallel to the at least one hydraulic fluid container.

3. The hydraulic system according to claim 1, wherein the at least one valve comprises a check valve.

4. The hydraulic system according to claim 3, wherein the check valve comprises a controlled check valve.

5. The hydraulic system according to claim 1, wherein the cooling line and the second inlet are hydraulically connected to the hydraulic circuit in the low-pressure region.

6. The hydraulic system according to claim 1, wherein, at the inlet of the discharge line and/or of the cooling line, a second volume-variable and/or speed-variable hydraulic machine driven by an electric motor is arranged.

7. The hydraulic system according to claim 6, wherein a restrictor is arranged at the inlet of the discharge line and/or of the cooling line.

8. The hydraulic system according to claim 1, wherein the at least one hydraulic fluid container is arranged in the low-pressure region.

9. The hydraulic system according to claim 8, wherein the at least one hydraulic fluid container is a closed container.

10. The hydraulic system according to claim 9, wherein the closed container comprises a pressure accumulator.

11. The hydraulic system according to claim 8, comprising a second hydraulic fluid container arranged in the low-pressure region.

12. The hydraulic system according to claim 11, wherein the first hydraulic fluid container is a closed container and the second hydraulic fluid container is a non-pressurized container.

13. The hydraulic system according to claim 12, wherein the closed container is a pressure accumulator and the non-pressurized container is an open container.

14. The hydraulic system according to claim 11, wherein a second hydraulic machine is arranged between the low-pressure region of the hydraulic circuit and the second hydraulic fluid container.

15. The hydraulic system according to claim 11, wherein the discharge line and the cooling line are fluidically connected to the second hydraulic fluid container.

16. The hydraulic system according to claim 11, wherein the inlet of the discharge line and/or of the cooling line is fluidically connected to the second hydraulic fluid container.

17. The hydraulic system according to claim 1, wherein a cooler is arranged in the low-pressure region, at the second inlet, at the discharge line, at the cooling line, or at the at least one hydraulic fluid container.

18. A method for using the hydraulic system of claim 1, wherein the hydraulic fluid from the leakage of the hydraulic machine is used to cool the electric motor.

* * * * *